United States Patent
Velasquez et al.

(10) Patent No.: US 9,902,102 B2
(45) Date of Patent: Feb. 27, 2018

(54) PROCESS FOR FORMING FILM

(71) Applicants: Davi Velasquez, Calhoun, GA (US); Michael A Kinnan, North Canton, OH (US); Stephen Nenadov, Wadsworth, OH (US); William J Rafier, Ravenna, OH (US)

(72) Inventors: Davi Velasquez, Calhoun, GA (US); Michael A Kinnan, North Canton, OH (US); Stephen Nenadov, Wadsworth, OH (US); William J Rafier, Ravenna, OH (US)

(73) Assignee: Berry Plastics Corporation, Evansville, IN (US)

( * ) Notice: Subject to any disclaimer, the term of this patent is extended or adjusted under 35 U.S.C. 154(b) by 586 days.

(21) Appl. No.: 14/014,966

(22) Filed: Aug. 30, 2013

(65) Prior Publication Data

US 2015/0061198 A1    Mar. 5, 2015

(51) Int. Cl.
| | |
|---|---|
| *B29C 47/00* | (2006.01) |
| *B29C 47/20* | (2006.01) |
| *B29C 47/34* | (2006.01) |
| *B29C 47/88* | (2006.01) |
| *B29C 47/92* | (2006.01) |
| *B29C 55/28* | (2006.01) |

(52) U.S. Cl.
CPC ...... *B29C 47/0057* (2013.01); *B29C 47/0026* (2013.01); *B29C 47/0066* (2013.01); *B29C 47/20* (2013.01); *B29C 47/34* (2013.01); *B29C 47/8805* (2013.01); *B29C 47/8825* (2013.01); *B29C 47/8845* (2013.01); *B29C 47/92* (2013.01); *B29C 55/28* (2013.01); *B29C 2947/92704* (2013.01)

(58) Field of Classification Search
CPC .................................................. B29C 47/0057
See application file for complete search history.

(56) References Cited

U.S. PATENT DOCUMENTS

| | | | | |
|---|---|---|---|---|
| 3,342,657 A | * | 9/1967 | Dyer | B26D 3/162 156/163 |
| 3,551,540 A | * | 12/1970 | Pellicciari et al. | B29C 47/8825 264/209.5 |
| 3,659,000 A | | 4/1972 | Cronk | |
| 4,034,055 A | | 7/1977 | Strutzel et al. | |
| 4,354,997 A | * | 10/1982 | Mizutani | B29C 55/16 264/230 |
| 4,379,774 A | | 4/1983 | Andersen et al. | |

(Continued)

FOREIGN PATENT DOCUMENTS

JP    2008063422 A  *  3/2008

OTHER PUBLICATIONS

PCT Search Report and Written Opinion established in connection with PCT/US2014/051814 and completed on Nov. 11, 2014.

*Primary Examiner* — Ryan Ochylski
(74) *Attorney, Agent, or Firm* — Barnes & Thornburg LLP (57) ABSTRACT

A method of making and using a stretchable film includes an extruding operation where molten plastics materials are extruded into a tube and a blowing operation in which the tube is blown to expand a diameter of the tube and form a blown-film tube. The blown-film tube is slit to form a film sheet that may be deformed elastically in a machine direction.

42 Claims, 3 Drawing Sheets

(56) References Cited

U.S. PATENT DOCUMENTS

| | | | | |
|---|---|---|---|---|
| 5,068,070 A | * | 11/1991 | Gunji | B29C 47/0026 |
| | | | | 264/146 |
| 2002/0017740 A1 | | 2/2002 | Gennesson | |
| 2007/0260016 A1 | * | 11/2007 | Best | B32B 27/32 |
| | | | | 525/240 |
| 2009/0297810 A1 | * | 12/2009 | Fiscus | B32B 27/32 |
| | | | | 428/220 |
| 2010/0021738 A1 | | 1/2010 | Maida et al. | |
| 2011/0028622 A1 | * | 2/2011 | Uradnisheck | B32B 27/36 |
| | | | | 524/211 |

* cited by examiner

PROCESS FOR FORMING FILM

BACKGROUND

The present disclosure relates to a process for forming a film, and in particular to a film made of plastics materials. More particularly, the present disclosure relates to a process for forming a stretchable film made from plastics materials.

SUMMARY

According to the present disclosure, a film-manufacturing process includes an extruding operation in which molten plastics materials are extruded into a tube and a blowing operation in which the tube is blown to expand a diameter of the tube to establish a blown-film tube. The film-manufacturing process further includes a slitting operation in which the blown-film tube is slit to form a film sheet.

In illustrative embodiments, the film-manufacturing process further includes a heating operation in which heat is applied to the blown-film tube to provide a heated-film tube. The film-manufacturing process also includes an elongating operation in which the heated-film tube is elongated by applying a force to the film tube in a machine direction to provide an elongated-film tube. The film-manufacturing process further includes a cooling operation in which the elongated-film tube is cooled to provide a cooled-film tube. The film-manufacturing process further includes the slitting operation in which the cooled-film tube is slit to form a stretchable film sheet configured to deform elastically in a transverse direction which is generally at about a right angle to the machine direction.

In illustrative embodiments, the heating operation is performed using a number of heated forming rollers and the blown-film tube is passed over the heated forming rollers to heat the film tube. In illustrative embodiments, the elongating operation is also performed using the number of heated forming rollers. In illustrative embodiments, the elongating step occurs during the heating step. In illustrative embodiments, the cooling operation is performed using a cooled forming roller and the elongated-film tube is passed over the cooled forming roller to cool the film tube.

In illustrative embodiments, the blown-film tube is heated to a temperature greater than a softening temperature of the plastics materials during the heating operation. As a result, a molecular structure of the heated-film tube is re-oriented during the elongating operation.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
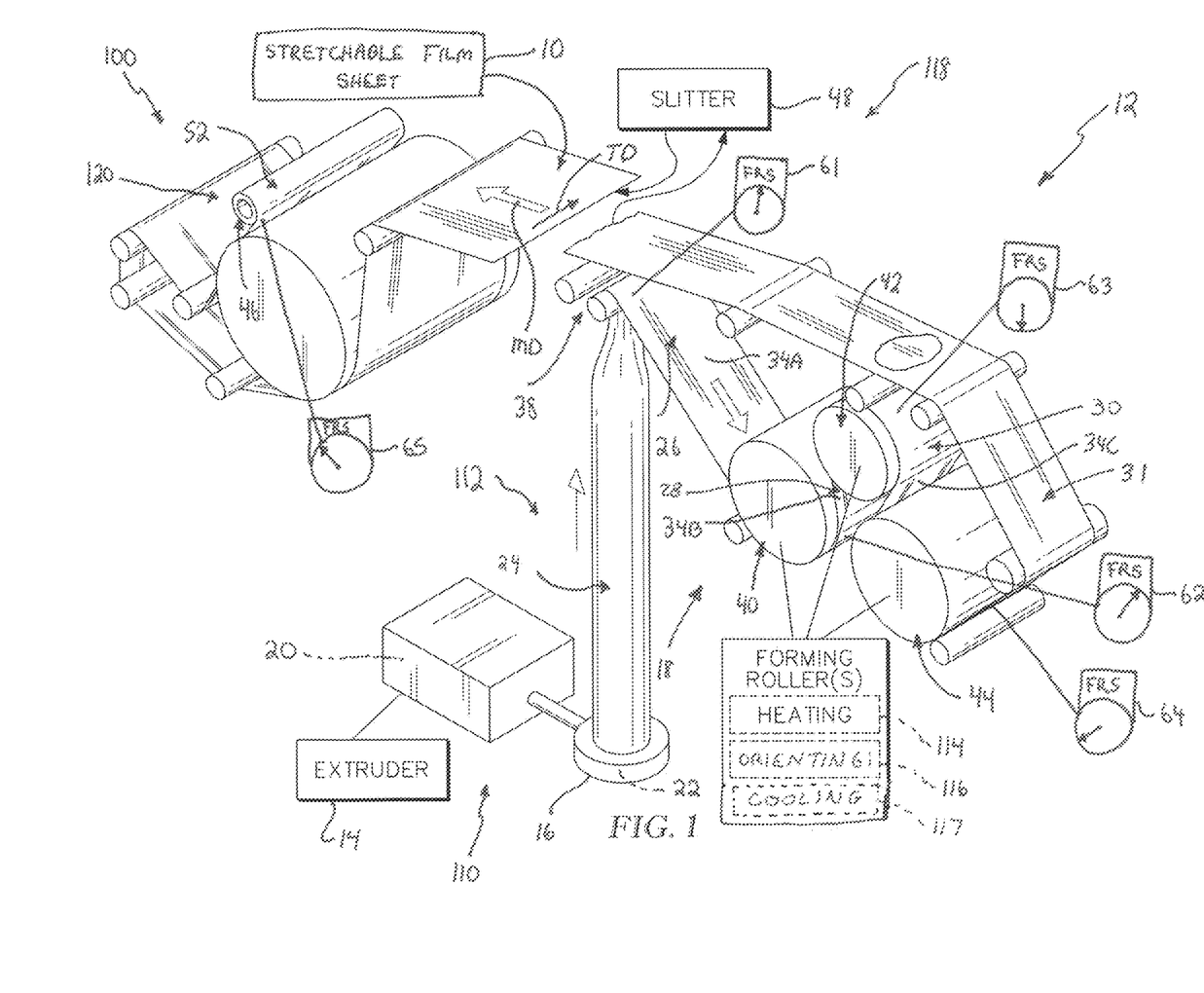
FIG. 1 is a perspective and diagrammatic view of a film-manufacturing process used to form a stretchable film showing that the process begins at a lower left of the page with an extruder extruding a molten plastics materials into a circular extrusion die where the molten plastics materials are extruded into a tube and blown to expand a diameter of the tube and form a blown-film tube which is then drawn upwardly between a pair of nip rollers where the blown-film tube is flattened and drawn over a number of heated rollers to orient the blown-film tube through application of heat and the elongation of heated-film tube to establish an elongated-film tube that is cooled and slit to form a stretchable film sheet which deforms elastically in a transverse direction and a machine direction.
Figure 2:
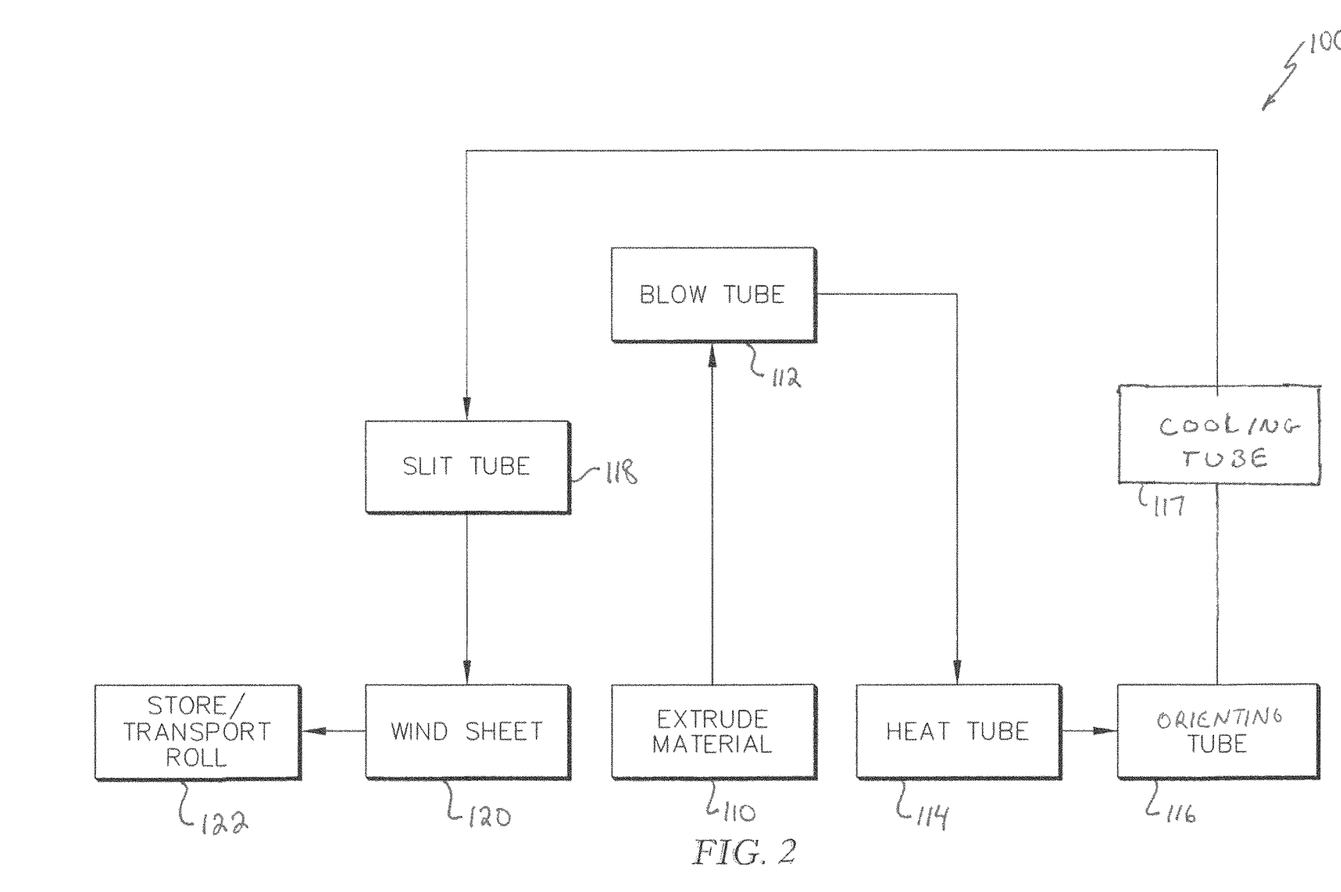
FIG. 2 is a diagrammatic view of the film-manufacturing process of FIG. 1 showing that the process includes the operations of extruding a molten plastics materials to form a tube, blowing the tube to form the blown-film tube, heating the blown-film tube to soften the plastics materials and form the heated-film tube, elongating the heated-film tube to re-orient the molecular structure of the heated-film tube to form the elongated-film tube, cooling the elongated film tube to form a cooled-film tube, slitting the cooled-film tube to form the stretchable film sheet, winding the stretchable film sheet to establish a roll of stretchable film, and storing/transporting the roll of stretchable film for future use.

A stretchable film sheet 10 in accordance with the present disclosure is formed by a film-manufacturing process 100 as shown in FIG. 2 using a blown-film manufacturing line 12 as shown, for example, in FIG. 1. Stretchable film sheet 10 is configured to deform elastically (e.g. stretch) in both a machine direction (MD) and a transverse direction (TD) as shown in FIG. 1. Film-manufacturing process 100 includes a heating operation 114 which applies heat to a blown-film tube 24 to cause blown-film tube 24 to soften and establish a heated-film tube 28. Film-manufacturing process 100 then proceeds to an orienting operation 116 which stretches heated-film tube 28 to cause a molecular structure of heated-film tube 28 to re-orient in machine direction (MD) and establish the stretchable film sheet 10 which deforms elastically in transverse direction (TD).

Stretchable film sheet 10 is formed using film-manufacturing process 100 as shown illustratively in FIG. 1 and shown diagrammatically in FIG. 2. Film-manufacturing process 100 includes several operations and begins with an extruding operation 110 in which plastics materials 20 are heated into molten plastics materials and extruded to form a tube. Film-manufacturing process 100 next proceeds to a blowing operation 112 in which air is blown into the tube to expand a diameter of the tube and establish blown-film tube 24. Film-manufacturing process 100 then proceeds to a heating operation 114 in which heat is applied to blown-film tube 24 to establish heated-film tube 28. Next, film-manufacturing process 100 proceeds to an orienting operation 116 in which heated-film tube 28 is stretched in machine direction (MD) to establish an oriented-film tube 30. Film-manufacturing process 100 then proceeds to a cooling operation 117 in which oriented-film tube 30 is cooled to establish a cooled-film tube 31. Film-manufacturing process 100 then proceeds to a slitting operation 118 in which cooled-film tube 31 is cut or slit to produce stretchable film sheet 10 as shown in FIG. 2.

Film-manufacturing process 100 is performed, for example, on blown-film manufacturing line 12 as shown in FIG. 1. As illustrated in FIGS. 1 and 2, blown-film manufacturing line 12 includes an extruder 14 and a circular extrusion die 16 which cooperate together to perform extruding operation 110. During extruding operation 110, extruder 14 heats and extrudes plastics materials 20 into circular extrusion die 16 to form the tube. Blown-film manufacturing line 12 further includes a blower which blows air into a center space formed in the tube to expand a diameter of the tube and establish blown-film tube 24 during blowing operation 112. Blown-film manufacturing line 12 also includes a number of forming rollers 18 that perform heating operation 114, orienting operation 116, and cooling operation 117 to provide cooled-film tube 31. Blown-film manufacturing line 12 also includes a slitter 48 which performs slitting operation 118 to provide stretchable film sheet 10. Stretchable film sheet 10 is then wounded by a winder 46 into a roll 52 during a winding operation 120 included in film-manufacturing process 100 that is ready for transportation or storage.

Figure 3:
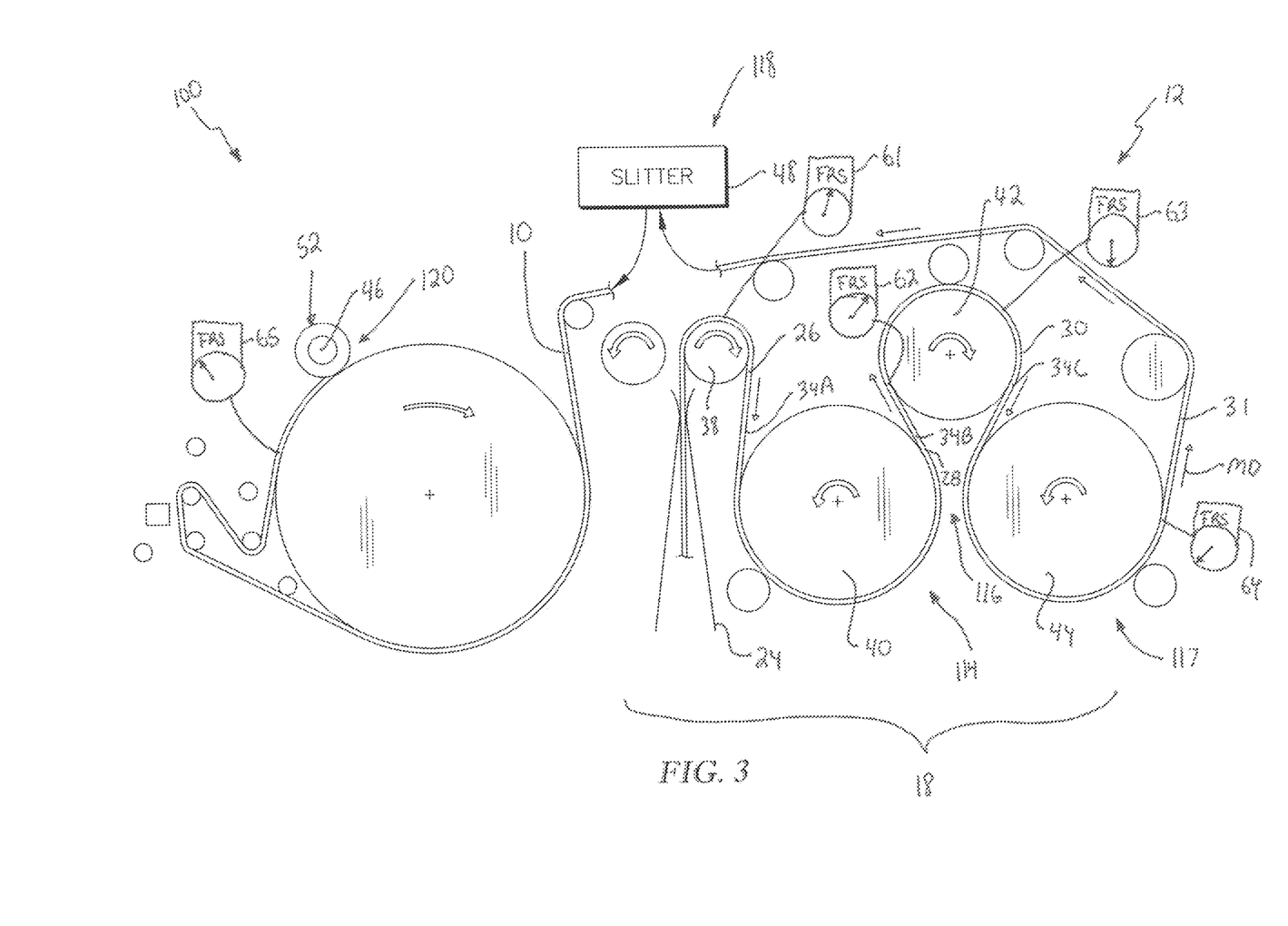
FIG. 3 is a sectional view taken along line 3-3 of FIG. 1 showing that the blown-film tube travels around a nip roller at a first feed rate as measured by a first Feed Rate Sensor (FRS), down around a rear hot roller at a relatively greater second feed rate as measured by a second FRS to establish the heated-film tube, up over a front roller at a relatively greater third feed rate as measured by a third FRS, down around a cooled roller at a relatively greater fourth feed rate as measured by a fourth FRS to establish the cooled-film tube, and suggesting that the increasing feed rates of the film tube applies force to the film tube in the machine direction to elongate the film tube and establish the stretchable film sheet as a result.

Forming rollers 18 include nip rollers 38, a rear hot roller 40, a front roller 42, and a cooled roller 44 as shown in FIG. 3. Nip rollers 38 draw blown-film tube 24 upwardly away from circular extrusion die 16 and flatten blown-film tube 24. Rear hot roller 40 performs heating operation 114 in which blown-film tube 24 is heated to a temperature greater than a softening temperature of plastics materials 20 so that the molecular structure of blown-film tube 24 will re-orient during stretching. Rear hot roller 40 and front roller 42 cooperate to perform orienting operation 116 in which heated-film tube 28 is stretched in machine direction (MD) to re-orient the molecular structure of the film to establish oriented-film tube 30. Cooled roller 44 performs cooling operation 117 in which oriented film tube 30 is cooled to establish cooled-film tube 31. After slitting operation 118 is complete, stretchable film sheet 10, having desirable transverse direction properties, is established.

Nip rollers 38 of forming rollers 18 are configured to receive and flatten blown-film tube 24 to establish a flattened blown-film tube 26 as shown in FIG. 1. Nip rollers 38 move flattened blown-film tube 26 at a nip-roller feed rate as measured by a first Feed Rate Sensor (FRS) 61. Nip rollers 38 are also configured to have a nip-roller temperature of about 75 degrees Fahrenheit. In one example, nip rollers 38 cause the flattened blown-film tube 26 to move at a nip-roller feed rate of about 66 yards per minute toward rear hot roller 40 as shown in FIGS. 1 and 3.

Rear hot roller 40 of forming rollers 18 receives flattened blown-film tube 26 from nip rollers 38 as shown in FIG. 1. Rear hot roller 40 is configured to have a rear hot-roller temperature which is greater than the softening temperature of plastics materials 20. The softening temperature of plastics materials 20 is a temperature at which elongating the heated-film tube 28 begins to cause the molecular structure of the plastics materials 20 to re-orient. Heat is transferred from rear hot roller 40 to flattened blown-film tube 26 to establish heated-film tube 28 as flattened blown-film tube 26 passes around rear hot roller 40. At the same time, rear hot roller 40 moves heated-film tube 28 at a relatively greater rear hot-roller fee rate as compared to nip rollers 38 and as measured by a second FRS 62 as shown in FIG. 1. Flattened blown-film tube 26 begins to stretch and elongate because rear hot-roller feed rate is greater than the nip-roller feed rate.

In one illustrative example, rear hot roller 40 has rear hot-roller temperature of about 119 degrees Fahrenheit. In one example, rear hot roller 40 causes flattened blown-film tube 26 to move past rear hot roller 40 at a rear hot-roller feed rate of about 70 yards per minute toward front roller 42 as shown in FIGS. 1 and 3.

Front roller 42 of forming rollers 18 receives heated-film tube 28 from rear hot roller 40 as shown in FIG. 1. At the same time, front roller 42 moves heated-film tube 28 at a relatively greater front-roller feed rate as measured by a third FRS 63 as shown in FIG. 1. As a result, heated-film tube 28 continues to stretch and elongate due to the difference between front-roller feed rate and rear hot-roller feed rate. As heated-film tube 26 is moved and elongated from rear hot roller 40 to front roller 42, the molecular structure of heated-film tube 28 re-orients in Machine Direction (MD) to establish oriented-film tube 30.

Front roller 42 is configured to have a front roller temperature which is less than the softening temperature of plastics materials 20. In one illustrative example, front roller 42 has front-roller temperature of about 90.6 degrees Fahrenheit. In one example, front roller 42 causes oriented-film tube 30 to move past front roller 42 at a front-roller feed rate of about 88 yards per minute toward cooled roller 44 as shown in FIGS. 1 and 3.

Cooled roller 44 of forming rollers 18 receives oriented-film tube 30 from front roller 42 as shown in FIG. 1. Cooled-roller temperature is less than the front-roller temperature. As a result, heat is transferred away from heated-film tube 28 to cooled roller. Cooled roller 44 is configured to have a cooled-roller temperature sufficient to re-set the molecular structure of oriented-film tube 30 so that elongating oriented-film tube 30 further does not re-orient the molecular structure.

At the same time, cooled roller 44 moves oriented-film tube 30 at a relatively greater cooled-roller feed rate as measured by a fourth FRS 64 as shown in FIG. 1. As a result, oriented-film tube 30 continues to stretch and elongate due to the difference between the cooled-roller feed rate and the front-roller feed rate to provide cooled-film tube 31.

In one illustrative example, cooled roller 44 has a cooled-roller temperature of about 75 degrees Fahrenheit. In one example, cooled roller 44 causes oriented-film tube 30 to move past cooled roller 44 at a cooled-roller feed rate of about 118 yards per minute toward winder 46 as shown in FIGS. 1 and 3.

After cooled-film tube 31 is established by forming rollers 18, cooled-film tube 31 moves toward slitter 48 as shown in FIGS. 1 and 3. Slitter 48 is located between cooled roller 44 and winder 46. Slitter 48 slits cooled-film tube 31 to provide stretchable film sheet 10 as shown in FIG. 1. Once stretchable film sheet 10 is established, it is drawn toward winder 46.

Winder 46 receives stretchable film sheet 10 from slitter 48 as shown in FIG. 1. Winder 46 is configured to have a winder temperature which is greater than the cooled-roller and front hot-roller temperatures. As a result, heat is transferred from winder 46 to stretchable film sheet 10 as stretchable film sheet 10 moves around winder 46. At the same time, winder 46 is moves stretchable film sheet 10 at a relatively greater winder feed rate as measured by a fifth FRS 65 as shown in FIG. 1.

In one illustrative example, winder roller has winder temperature of about 108 degrees Fahrenheit. In one example, winder 46 causes stretchable film sheet 10 to wind around winder 46 at a winder feed rate of about 126 yards per minute to form a roll 52 of stretchable film sheet 10 as shown in FIGS. 1 and 3. Roll 52 of stretchable film sheet 10 may be transported and stored for future use.

Stretchable film sheet 10 is made from plastics materials 20. In the illustrative embodiment, the plastics materials 20 include a Polyvinyl Chloride (PVC) resin. In some examples, plastics materials 20 include about 65-75% PVC resin by weight, 20-28% plasticizer by weight such as, for example, di-octyl adipate (DOA), epoxidized soy bean oil (ESBO), and other plasticizers, and 3-10% anti-fogs and stabilizers by weight such as, for example, glycerol mono-oleate, sorbitan mono-oleate, TNPP, calcium stearate, and zinc stearate. As an example, the PVC resin is Shintech Polyvinyl Chloride SE-1300F and the plasticizer is a blend of Eastman DOA and V7170 ESBO.

Stretchable film sheet 10 has an un-stretched width as measured in transverse direction (TD). A first stress is applied to stretchable film sheet 10 in transverse direction (TD) to establish a relatively greater first stretched width which is about 50% greater than the un-stretched width. A relatively greater second stress is applied to stretchable film sheet 10 in transverse direction (TD) to establish a relatively greater second stretched width which is about 100% greater than the un-stretched width. In one example, the first stress is about 740 pounds per square inch to about 1,210 pounds per square inch. In another example, the relatively greater second stress is about 1,100 pounds per square inch to about 1,625 pounds per square inch.

In comparison, flattened blown-film tube 26 is slit to form a blown-film sheet which has an un-stretched width as measured in transverse direction (TD). Blown film sheet is formed using substantially the same plastics materials 20 of stretchable film sheet 10 and the outer dimensions of blown-film sheet and stretchable film sheet 10 are substantially equal. A first stress is applied to the blown-film sheet in transverse direction (TD) to establish a relatively greater first stretched width which is about 50% greater than the un-stretched width. A relatively greater second stress is applied to the blown-film sheet in transverse direction (TD) to establish a relatively greater second stretched width which is about 100% greater than the un-stretched width. In one example, the first stress is about 1,280 pounds per square inch. In another example, the relatively greater second stress is about 2,070 pounds per square inch.

Stretchable film sheet 10 has an ultimate strength in transverse direction (TD). Ultimate strength is the amount of stress a material can withstand before breaking. In one example, the ultimate strength in the transverse direction (TD) was about 2,700 pounds per square inch to about 3,400 pounds per square inch. In other embodiments, stretchable film sheet 10 has an ultimate strength in the transverse direction (TD) of about 2,800 pounds per square inch. In comparison, the blown-film sheet has an ultimate strength of about 4,000 pounds per square inch to about 4,150 pounds per square inch.

Stretchable film sheet 10 has a yield strength in transverse direction (TD). Yield strength is an amount of stress necessary to cause inelastic deformation of the material. In one example, the yield strength of stretchable film sheet is about 280 pounds per square inch to about 340 pounds per square inch. In comparison, the blown-film sheet has a yield strength of about 230 pounds per square inch to about 250 pounds per square inch.

An illustrative continuous film-manufacturing process 100 for manufacturing stretchable film sheet 10 is shown in FIGS. 1 and 2. The method includes extruding operation 110, blowing operation 112, heating operation 114, orienting operation 116, cooling operation 117, slitting operation 118, winding operation 120, and a storing operation 122.

During extruding operation 110, extruder 14 heats plastics materials 20 until plastics materials 20 are melted. Plastics materials 20 may be, for example, raw thermoplastics materials in the form of beads which are also called resin. In the illustrative embodiment, plastics materials 20 includes polyvinyl chloride (PVC) resin 20. Extruder 14 moves continuously melted plastics materials 20 into circular extrusion die 16 where melted plastics materials 20 are formed into tube 22. Tube 22 has a first inner diameter and a first outer diameter as suggested in FIG. 1.

During blowing operation 112, a gas such as air, for example, is forced into circular extrusion die 16 to establish blown-film tube 24 as shown in FIG. 1. The gas forces tube 22 upward and out of the circular extrusion die 16. The gas applies an outward force to tube 22 to expand the first inner and outer diameters of tube 22 to form blown-film tube 24. The first inner diameter of tube 22 expands to a relatively greater second inner diameter and the first outer diameter of tube 22 expands to a relatively greater second outer diameter to form blown-film tube 24.

During heating operation 114, blown-film tube 24 is heated by forming rollers 18 as shown in FIG. 1. In the illustrative embodiment, forming rollers 18 heat blown-film tube 24 to a temperature greater than a softening temperature of plastics materials 20. In the illustrative embodiment, the softening temperature of plastics materials 20 is less than a vicat softening temperature of PVC. Forming rollers 18 include nip rollers 38, rear hot roller 40, front roller 42, and cooled roller 44.

Forming rollers 18 heat blown-film tube 24 to at least the softening temperature of the plastics materials 20 so that the molecular structure of blown-film tube 24 will re-orient during orienting operation 116. The molecular structure is re-oriented by applying a force to heated-film tube 28. In the illustrative embodiment, the molecular structure of blown-film tube 24 is re-oriented when rear hot roller 40, front roller 42, and cooled roller 44 elongate heated-film tube 28. Cooled roller 44 cools oriented-film tube 30 to re-set the molecular structure of oriented-film tube 30 so that further elastic deformation does not re-orient the molecular structure.

Nip rollers 38 included in forming rollers 18 pull blown-film tube 24 upwardly away from circular extrusion die 16 and flatten blown-film tube 24 to form a flattened blown-film tube 26 as shown in FIG. 1. Flattened blown-film tube 26 has a sheet width equal to approximately half of the second outer diameter multiplied by pi. Nip rollers 38 are maintained at a temperature of about 75 degrees Fahrenheit. In other embodiments, nip rollers 38 are maintained at temperatures in a range of about 70 degrees Fahrenheit to about 100 degrees Fahrenheit. In one example, nip rollers 38, rear hot roller 40, and front roller 42 are heated by flowing water through one or more internal channels formed in rollers 38, 40, 42. In other embodiments, nip rollers 38, rear hot roller 40, and front roller 42 are heated by any other suitable alternative.

Rear hot roller 40 applies heat to flattened blown-film tube 26 to heat flattened blown-film tube 26 to a temperature greater than the softening temperature. Rear hot roller 40 is maintained at a temperature of about 119 degrees Fahrenheit. In other embodiments, rear hot roller 40 is maintained at temperatures in a range of about 100 degrees Fahrenheit to about 220 degrees Fahrenheit. In other embodiments, rear hot roller 40 is maintained at temperatures in a range of about 120 degrees Fahrenheit to about 200 degrees Fahrenheit. In other embodiments, rear hot roller 40 is maintained at temperatures in a range of about 120 degrees Fahrenheit to about 160 degrees Fahrenheit. In other embodiments, forming rollers 18 may not include rear hot roller 40 and blown-film tube 26 may be heated as it is passed through a heat tunnel or by infrared heaters. Rear hot roller 40 moves heated-film tube 28 toward front roller 42.

Front roller 42 is maintained at a temperature of about 90.6 degrees Fahrenheit. In other embodiments, front roller 42 is maintained at temperatures greater than or less than 90.6 degrees Fahrenheit. In some embodiments, front roller 42 is maintained at front-roller temperature as a result of steady state operating conditions of blown-film manufacturing line 12. In other embodiments, front roller 42 is actively heated or cooled to maintain the front-roller temperature. Front roller 42 moves heated-film tube 28 toward cooled roller 44. In other embodiments, front roller 42 moves heated-film tube 28 to orienting operation 116 before heated-film tube 28 is moved to cooled roller 44.

Cooled roller 44 absorbs heat from heated-film tube 28 as heated-film tube 28 moves around cooled roller 44 to cool heated-film tube 28 to a temperature less than the softening temperature. Cooled roller 44 is maintained at a temperature of about 75 degrees Fahrenheit. In other embodiments, cooled roller 44 is maintained at temperatures in a range of about 70 degrees Fahrenheit to about 100 degrees Fahrenheit. Cooled roller 44 is cooled by flowing water through one or more internal channels formed in cooled roller 44. However, any other suitable alternative may be used to maintain cooled roller 44 at the temperature less than the softening temperature. In other embodiments, forming rollers 18 may not include cooled roller 44 and oriented-film tube 30 may be cooled passively through heat transfer to air surrounding blown-film manufacturing line 12.

During orienting operation 116, one or more forces are applied to heated-film tube 28 to re-orient the molecular structure of heated-film tube 28 to provide oriented-film tube 30. In the illustrative embodiment, forming rollers 18 move heated-film tube 28 at progressively increasing rates so that force is applied to heated-film tube 28 in machine direction (MD). In one example, orienting operation 116 occurs during heating operation 114. In other examples, orienting operation 116 occurs after heating operation 114 while heated-film tube 28 still has a temperature above the softening temperature.

Orienting operation 116 occurs, for example, as a result of forming rollers 18 moving at progressively faster rotational speeds causing feed rates of the film to increase. As suggested in FIG. 1, nip rollers 38 move flattened-film tube 26 away from circular extrusion die 16 toward rear hot roller 40 at nip-roller feed rate of about 66 yards per minute. In other embodiments, nip rollers 38 move flattened-film tube 26 at a nip-roller feed rate greater than or less than 66 yards per minute. Nip rollers 38 heat flattened blown-film tube 26 and move flattened blown-film tube 26 to rear hot roller 40.

Rear hot roller 40 moves heated-film tube 28 at rear hot-roller feed rate which is relatively greater rate than nip-roller feed rate. Rear hot roller 40 moves heated-film tube 28 away from nip rollers 38 and toward front roller 42 at rear hot-roller feed rate of about 70 yards per minute. In other embodiments, rear hot roller 40 moves heated-film tube 28 at a rear hot roller feed rate greater than or less than about 70 yards per minute.

As rear hot-roller feed rate is relatively greater than nip-roller feed rate, rear hot roller 40 pulls a portion 34A of flattened blown-film tube 26 that is suspended between rear hot roller 40 and nip rollers 38 to make flattened blown-film tube 26 taught so that rear hot roller 40 heats evenly flattened blown-film tube. The molecular structure of portion 34A of flattened blown-film tube 26 may not re-orient because flattened blown-film tube has a temperature below the softening temperature. Rear hot roller 40 heats flattened blown-film tube 26 and moves heated-film tube 28 toward front roller 42.

Front roller 42 moves heated-film tube 28 at front hot-roller feed rate which is relatively greater rate than rear hot-roller feed rate. Front roller 42 moves heated-film tube 28 away from rear hot roller 40 and toward cooled roller 44 at front hot-roller feed rate of about 88 yards per minute. In other embodiments, front roller 42 moves heated-film tube 28 at a front roller feed rate greater than or less than about 88 yards per minute.

As front hot-roller feed rate is greater than rear hot-roller feed rate, front roller 42 pulls a portion 34B of heated-film tube 28 that is suspended between front roller 42 and rear hot roller 40 to apply a force to portion 34B of heated-film tube 28 to re-orient the molecular structure of portion 34B and establish oriented-film tube 30. Front roller 42 moves oriented-film tube 30 toward cooled roller 44.

Cooled roller 44 moves heated-film tube 28 at cooled-roller feed rate which is relatively greater than front-roller feed rate. Cooled roller 44 moves oriented-film tube 30 away from front roller 42 toward slitter 48 at cooled-roller feed rate of about 118 yards per minute. In other embodiments, cooled roller 44 moves oriented-film tube 30 at a cooled-roller feed rate of greater than or less than about 118 yards per minute.

As cooled-roller feed rate is greater than front-roller feed rate, cooled roller 44 pulls a portion 34C of heated-film tube 28 that is suspended between cooled roller 44 and front roller 42 to apply a force to portion 34C that may re-orient the molecular structure. Cooled roller 44 cools oriented-film tube 30 to establish cooled-film tube 31 in which the re-oriented molecular structure of portion 34C becomes fixed so that elastic deformation of cooled-film tube 31 does not re-orient the molecular structure. Cooled roller 44 moves cooled-film tube 31 through slitter 48 toward winder 46.

During slitting operation 118, oriented-film tube 30 is provided to slitter 48 where cooled-film tube 31 is slit and the two layers of cooled-film tube 31 unfold to provide stretchable film sheet 10 as shown in FIG. 1. Stretchable film sheet 10 has a width that is twice as large as cooled-film tube 31.

During winding operation 120, stretchable film sheet 10 is provided to winder 46 for winding into roll 52 and prepared for transport as shown in FIG. 3. Winder 46 winds stretchable film sheet 10 into roll 52 at a winder feed rate of about 108 yards per minute. In other embodiments, winder 46 winds stretchable film sheet 10 at a winder feed rate greater than or less than about 108 yards per minute.

During storing operation 122, roll 52 of stretchable film sheet 10 is packaged to provide stored roll 52. Stretchable film sheet 10 is preserved in stored roll 52 until stretchable film sheet 10 is consumed by a user. A user may remove a portion of stretchable film sheet 10 from stored roll 52 and stretch stretchable film sheet 10 in transverse direction (TD) over products such as, for example, cuts of meat.

The invention claimed is:
1. A method of making and using a stretchable film sheet, the method comprising the steps of
　　extruding a tube made of plastics materials including polyvinyl chloride,
　　blowing the tube to establish a blown-film tube having a first temperature and a first length,
　　flattening the blown-film tube with a nip roller, heating the flattened blown-film tube to provide a heated-film tube, elongating the flattened heated-film tube by applying force to the heated-film tube in only a first direction to provide a machine direction oriented-film tube having a relatively greater second length, cooling the machine direction oriented-film tube, slitting the machine direction oriented-film tube to provide a flattened machine direction oriented stretchable film sheet having twice the width of the machine direction oriented-film cooled-film tube, and deforming elastically the stretchable film sheet in a second direction transverse to the first direction, wherein during the heating and elongating steps:

the blown-film tube is flattened around a nip roller maintained at a first temperature and moves around the nip roller at a first feed rate, the flattened heated-film tube is passed around a second roller at a second temperature and moves around the second roller at a second feed rate, and the flattened heated-film tube is passed around a third roller at a third temperature and moves around the third roller at a third feed rate, wherein the second feed rate is greater than the first feed rate and the third feed rate is greater than the second feed rate, and wherein the third temperature is greater than the first temperature and the second temperature is greater than the third temperature.

2. The method of claim 1, wherein the second roller heats the flattened blown-film tube to the second temperature and the second temperature is above a softening temperature of the plastics materials including polyvinyl chloride.

3. The method of claim 2, wherein the second temperature is a temperature in a range of about 120 degrees Fahrenheit to about 125 degrees Fahrenheit.

4. The method of claim 1, wherein the heated roller is heated to a temperature in a range of about 100 degrees Fahrenheit to about 220 degrees Fahrenheit.

5. The method of claim 1, wherein the heated roller is heated to a temperature in a range of about 120 degrees Fahrenheit to about 200 degrees Fahrenheit.

6. The method of claim 1, wherein the heated roller is heated to a temperature in a range of about 120 degrees Fahrenheit to about 160 degrees Fahrenheit.

7. The method of claim 1, wherein the elongating step is performed while the heated-film tube is at the second temperature.

8. The method of claim 7, wherein the elongating step occurs during the heating step.

9. The method of claim 7, wherein the elongating step occurs after the heating step.

10. The method of claim 1, wherein the first direction is a machine direction.

11. The method of claim 1, wherein the second length is in a range of about 20 percent to 200 percent greater than a first length.

12. The method of claim 11, wherein the second length is in a range of about 50 percent to about 150 percent.

13. The method of claim 11, wherein the second length is about 50 percent greater.

14. The method of claim 1, wherein the second length is in a range of about 50 percent to about 100 percent greater than the first length.

15. The method of claim 14, wherein the first direction is a machine direction.

16. The method of claim 1, wherein the second temperature is about 119 degrees Fahrenheit.

17. The method of claim 16, wherein the the second feed rate is about 70 yards per minute.

18. The method of claim 17, wherein the feed rate is about 88 yards per minute.

19. The method of claim 18, wherein the third temperature of about 90.6 degrees Fahrenheit.

20. The method of claim 17, wherein the flattened blown-film tube is passed around a fourth roller maintained at a temperature of about 75 degrees Fahrenheit during the cooling step after being passed around the second roller.

21. The method of claim 20, wherein the flattened oriented-film tube moves around the fourth roller at a feed rate of about 118 yards per minute.

22. The method of claim 21, wherein the first temperature is about 75 degrees Fahrenheit.

23. The method of claim 22, wherein the first feed rate is about 66 yards per minute.

24. The method of claim 16, wherein the stretchable film sheet is passed around a fifth roller maintained at a temperature of about 108 degrees Fahrenheit after being passed around the second, a third, and a fourth roller.

25. The method of claim 24, further comprising the step of winding the stretchable film sheet around the fifth roller at a feed rate of about 126 yards per minute.

26. A method of forming a stretchable film sheet, the method comprising the steps of providing a blown-film tube made of plastics materials having a first temperature and a first length, flattening the blown-film tube with a nip roller, heating the flattened blown-film tube to provide a heated-film tube having a, elongating the flattened heated-film tube to provide an uniaxially machine oriented-film tube having a second length that is greater than the first length and a first width, and slitting the uniaxially machine oriented flattened film tube in the machine direction to provide a machine direction oriented stretchable film sheet having twice the width of the machine direction oriented flattened film cooled-film tube, wherein during heating and elongating, the flattened blown-film tube is fed from a nip roller having a first feed rate to a second roller having a second feed rate and to a third roller having a third feed rate during the elongating step, wherein the second feed rate is greater than the first feed rate and the third feed rate is greater than the second feed rate, wherein the nip roller is heated to a first temperature, the second roller is heated to a second temperature, and the third roller is heated to a third temperature, and wherein the third temperature is greater than the first temperature and the second temperature is greater than the third temperature.

27. The method of claim 26, wherein the second temperature is a temperature in a range of about 100 degrees Fahrenheit to about 220 degrees Fahrenheit.

28. The method of claim 26, wherein the second temperature is a temperature in a range of about 120 degrees Fahrenheit to about 160 degrees Fahrenheit.

29. The method of claim 26, wherein the second temperature is greater than a softening temperature of the plastics materials.

30. The method of claim 29, further comprising the step of cooling the oriented-film tube to a fourth temperature to provide a flattened cooled-film tube and the fourth temperature is less than the softening temperature.

31. The method of claim 29, wherein the plastics materials include polyvinyl chloride.

32. The method of claim 26, wherein the second length is about 20 percent to about 200 percent greater than the first length.

33. The method of claim 26, further including the step of deforming elastically the stretchable film sheet in a second direction transverse to a machine direction.

34. The method of claim 26, wherein the elongating step occurs during the heating step.

35. The method of claim 26, wherein the first, second and third rollers are heated to temperatures in a range of about 75 degrees Fahrenheit to about 130 degrees Fahrenheit.

36. The method of claim 26, wherein the elongating step includes the steps of applying force to the heated-film tube to establish an elongated-film tube and cooling the flattened elongated-film tube to provide a flattened cooled-film tube.

37. The method of claim 36, wherein the flattened elongated-film tube is passed around a number of non-heated rollers during the cooling step.

38. The method of claim 26, further comprising the step of applying a first stress according to ASTM D882 standard_of about 745 pounds per square inch to about 1,210 pounds per square inch to the stretchable film sheet in a direction transverse to a machine direction to cause the stretchable film sheet to have a second width about 50 percent greater than the first width.

39. The method of claim 38, further comprising the step of applying a second stress according to ASTM D882 standard of about 1,100 pounds per square inch to about 1,625 pounds per square inch to the stretchable film sheet in a direction transverse to a machine direction to cause the stretchable film sheet to have a third width about 100 percent greater than the first width.

40. The method of claim 26, wherein the stretchable film sheet has an ultimate yield strength in a direction transverse to a machine direction of about 2,704 pounds per square inch to about 3,400 pounds per square inch.

41. The method of claim 40, wherein the ultimate yield strength is about 2,800 pounds per square inch.

42. The method of claim 26, wherein the stretchable film sheet has a yield strength in a direction transverse to a machine direction of about 280 to 340 pounds per square inch.

* * * * *